United States Patent
Herrig et al.

(10) Patent No.: US 11,536,245 B2
(45) Date of Patent: Dec. 27, 2022

(54) ROTOR BLADE ASSEMBLY AND A WIND TURBINE HAVING THE ROTOR BLADE ASSEMBLY

(71) Applicant: General Electric Company, Schenectady, NY (US)

(72) Inventors: Andreas Herrig, Garching bei Munchen (DE); Drew Adam Wetzel, Easley, SC (US)

(73) Assignee: General Electric Company, Schenectady, NY (US)

( * ) Notice: Subject to any disclaimer, the term of this patent is extended or adjusted under 35 U.S.C. 154(b) by 887 days.

(21) Appl. No.: 15/873,170

(22) Filed: Jan. 17, 2018

(65) Prior Publication Data
US 2018/0209401 A1    Jul. 26, 2018

Related U.S. Application Data

(63) Continuation-in-part of application No. 15/415,961, filed on Jan. 26, 2017, now Pat. No. 10,465,652.

(51) Int. Cl.
*F03D 1/06*    (2006.01)

(52) U.S. Cl.
CPC ........ *F03D 1/0675* (2013.01); *F05B 2230/80* (2013.01); *F05B 2240/32* (2013.01);
(Continued)

(58) Field of Classification Search
CPC .... F03D 1/0675; F03D 1/0633; F03D 1/0683; F05B 2240/3062; Y02E 10/72; Y02P 70/50

See application file for complete search history.

(56) References Cited

U.S. PATENT DOCUMENTS 4,354,648 A * 10/1982 Schenk ............... B64C 21/10
                                                         244/200.1
7,351,041 B2 * 4/2008 Uselton ............... F04D 29/384
                                                         415/119
(Continued)

FOREIGN PATENT DOCUMENTS

DE    102013210737    * 12/2014 ........... F03D 1/0675
DE    3144525         *  3/2017
(Continued)

OTHER PUBLICATIONS

DE 102013210737 (Dec. 2014) Gollinck et al.; Translation and Foreign reference (Year: 2014).*
(Continued)

*Primary Examiner* — Topaz L. Elliott
*Assistant Examiner* — Aye S Htay
(74) *Attorney, Agent, or Firm* — Dority & Manning, P.A.

(57) ABSTRACT

A rotor blade assembly for a wind turbine is presented. The rotor blade assembly includes a rotor blade having a surface, where the surface of the rotor blade includes an inclined groove. The rotor blade assembly further includes at least one add-on element mounted on the surface of the rotor blade via a bonding interface downstream of the inclined groove such that particulate matter in an airflow upstream of the at least one add-on element is deflected away from the bonding interface between the surface of the rotor blade and the at least one add-on element. The wind turbine having the rotor blade assembly is also presented.

12 Claims, 9 Drawing Sheets

(52) U.S. Cl.
CPC .......... *F05B 2260/63* (2013.01); *Y02E 10/72* (2013.01); *Y02P 70/50* (2015.11)

(56) References Cited

U.S. PATENT DOCUMENTS

| | | | |
|---|---|---|---|
| 8,043,065 B2 | 10/2011 | Kyriakides | |
| 8,162,590 B2 | 4/2012 | Haag | |
| 9,039,381 B2 | 5/2015 | Grife et al. | |
| 9,133,816 B2 | 9/2015 | Jensen et al. | |
| 9,556,849 B2 | 1/2017 | Riddell et al. | |
| 10,487,796 B2 * | 11/2019 | Tobin | F03D 1/0675 |
| 10,487,798 B2 * | 11/2019 | Vossler | F03D 9/25 |
| 2003/0091436 A1 | 5/2003 | Stiesdal | |
| 2009/0068018 A1 * | 3/2009 | Corten | F03D 1/0633 416/223 R |
| 2009/0087314 A1 * | 4/2009 | Haag | F03D 1/0633 416/147 |
| 2010/0278654 A1 | 11/2010 | Kyriakides | |
| 2011/0142665 A1 * | 6/2011 | Huck | F03D 1/0633 416/228 |
| 2012/0100005 A1 * | 4/2012 | Ostergaard Kristensen | F03D 1/0608 416/241 R |
| 2012/0257977 A1 | 10/2012 | Jensen et al. | |
| 2012/0257978 A1 * | 10/2012 | Jensen | F03D 1/0608 416/223 R |
| 2013/0108457 A1 | 5/2013 | Thrue et al. | |
| 2014/0328687 A1 * | 11/2014 | Tobin | F03D 1/0633 416/174 |
| 2014/0328692 A1 * | 11/2014 | Riddell | F03D 1/0633 416/236 R |
| 2015/0132140 A1 | 5/2015 | Haag et al. | |
| 2016/0052621 A1 | 2/2016 | Ireland et al. | |
| 2016/0169190 A1 | 6/2016 | Neumann et al. | |
| 2016/0177914 A1 | 6/2016 | Enevoldsen et al. | |
| 2016/0215758 A1 | 7/2016 | Corten | |
| 2017/0314530 A1 | 11/2017 | Herrig et al. | |

FOREIGN PATENT DOCUMENTS

| | | |
|---|---|---|
| EP | 3144525 A1 | 3/2017 |
| WO | 2017012632 A1 | 1/2017 |
| WO | WO2017063927 A1 | 4/2017 |

OTHER PUBLICATIONS

European Search Report Corresponding to EP1915067 dated May 21, 2019.

Ham et al., "Some Conclusions from an Investigation of Blade-Vortex Interaction", Journal of the American Helicopter Society, http://www.ingentaconnect.com/content/ahs/jahs/1975/00000020/00000004/art00003, vol. 26, Issue 4, pp. 26-31, Oct. 1, 1975.

John C Lin, "Review of Research on Low-Profile Vortex Generators to Control Boundary-Layer Separation", Progress in Aerospace Sciences, http://www.sciencedirect.com/science/article/pii/S0376042102000106, vol. 38, Issue 4-5, pp. 389-420, May-Jul. 2002.

"A Method for Fabricating Leading Edge Erosion Protection Shield for Wind Blades", The IP.com Prior Art Database, https://priorart.ip.com/IPCOM/000246326, Disclosure No. IPCOM000246326D, May 30, 2016.

European Search Report for EP application No. 22165873.5, dated Jun. 23, 2022.

* cited by examiner

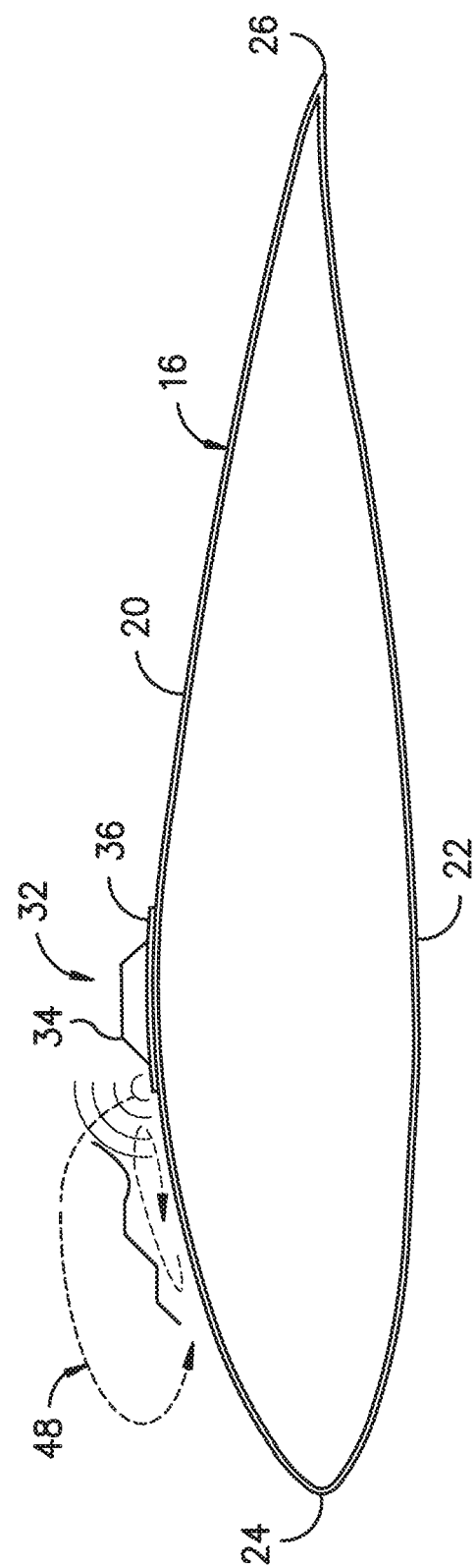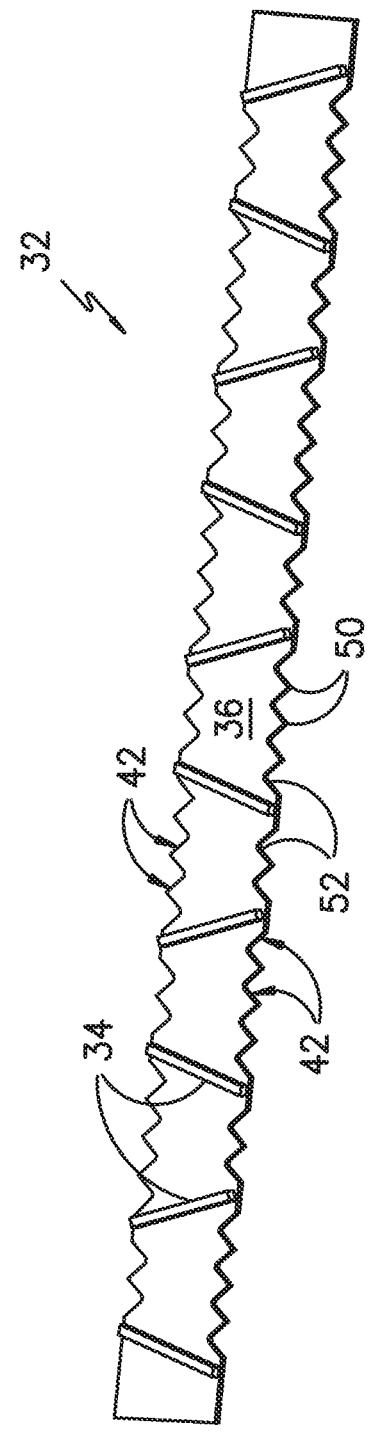
Fig. 4
Fig. 5

ROTOR BLADE ASSEMBLY AND A WIND TURBINE HAVING THE ROTOR BLADE ASSEMBLY

CROSS-REFERENCE TO RELATED APPLICATIONS

The application is a continuation-in-part of U.S. application Ser. No. 15/415,961 filed on Jan. 26, 2017, the entire contents of which are hereby incorporated by reference.

BACKGROUND

The present disclosure relates in general to rotor blades for wind turbines, and more particularly to a rotor blade having an inclined groove and one or more add-on elements.

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, accessory components are attached to the rotor blades of wind turbines to perform various functions during operation of the wind turbine. For example, it is known to change the aerodynamic characteristics of wind turbine rotor blades by adding protrusions or other structures (often referred to as "vortex generators") to the surface of the blade in order to increase the energy conversion efficiency during normal operation of the wind turbine by increasing the lift force of the blades while decreasing the drag force. Vortex generators serve to increase the attached-flow region and to reduce the detached-flow region by moving the point of flow separation nearer to the trailing edge of the blade or to delay it from occurring altogether. In particular, vortex generators create local regions of longitudinally rotating, turbulent airflow over the surface of the blade as a means to delay flow separation and thus optimize aerodynamic airflow around the blade contour.

Laminar boundary layer instability noise occurs, however, when flow instabilities are scattered by a uniform discontinuity (e.g. the edge of a vortex generator panel or other blade add-on elements) on the rotor blade surface. These scattered acoustic waves travel upstream, where they interact with and amplify the initial amplitude of the flow instabilities. The result is a feedback loop that produces multiple acoustic tones, regularly-spaced in frequency, which create undesirable noise for the wind turbine. Moreover, particulate matter contained in an airflow may also damage or lift-off add-on elements disposed on the rotor blade surface. Further, in some conditions, the add-on elements are also prone to erosion, especially, at a bonding interface between the add-on elements and the rotor blade surface, due water droplets contained in the airflow and impinging on the bonding interface.

BRIEF DESCRIPTION

In accordance with one embodiment of the present specification, a rotor blade assembly for a wind turbine is presented. The rotor blade assembly includes a rotor blade having a surface, where the surface of the rotor blade includes an inclined groove. The rotor blade assembly further includes at least one add-on element mounted on the surface of the rotor blade via a bonding interface downstream of the inclined groove such that particulate matter in an airflow upstream of the at least one add-on element is deflected away from the bonding interface between the surface of the rotor blade and the at least one add-on element.

In accordance with one embodiment of the present specification, a wind turbine is presented. The wind turbine includes a tower and a rotor hub mounted on the tower, and a plurality of rotor blade assemblies mounted in the rotor hub. One or more of the plurality of rotor blade assemblies include a rotor blade having a surface, where the surface of the rotor blade includes an inclined groove. The one or more of the plurality of rotor blade assemblies further include at least one add-on element mounted on the surface of the rotor blade via a bonding interface downstream of the inclined groove such that particulate matter in an airflow upstream of the at least one add-on element is deflected away from the bonding interface between the surface of the rotor blade and the at least one add-on element.

In accordance with one embodiment of the present specification, a rotor blade assembly for a wind turbine is presented. The rotor blade assembly includes a rotor blade having a surface. The rotor blade assembly further includes at least one add-on element mounted on the surface of the rotor blade via a bonding interface. Moreover, the rotor blade assembly includes at least one erosion protection feature protruding from the surface of the rotor blade upstream of the at least one add-on element such that particulate matter in an airflow upstream of the at least one add-on element is deflected away from the bonding interface by the at least one erosion protection feature, wherein the at least one erosion protection feature includes a curved surface.

DRAWINGS

These and other features, aspects, and advantages of the present specification will become better understood when the following detailed description is read with reference to the accompanying drawings in which like characters represent like parts throughout the drawings, wherein:

FIG. 4 is a cross-sectional view of a rotor blade assembly having a vortex generator mounted thereon, in accordance with one embodiment of the present specification;

FIG. 5 is a top view of a vortex generator having noise-reducing features, in accordance with one embodiment of the present specification;

DETAILED DESCRIPTION

In the effort to provide a concise description of these embodiments, all features of an actual implementation may not be described in the specification. It should be appreciated that in the development of any such actual implementation, as in any engineering or design project, numerous implementation-specific decisions may be made to achieve the developer's specific goals such as compliance with system-related and business-related constraints.

When describing elements of the various embodiments of the present specification, the articles "a", "an", and "the" are intended to mean that there are one or more of the elements. The terms "comprising", "including" and "having" are intended to be inclusive and mean that there may be additional elements other than the listed elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Figure 1:
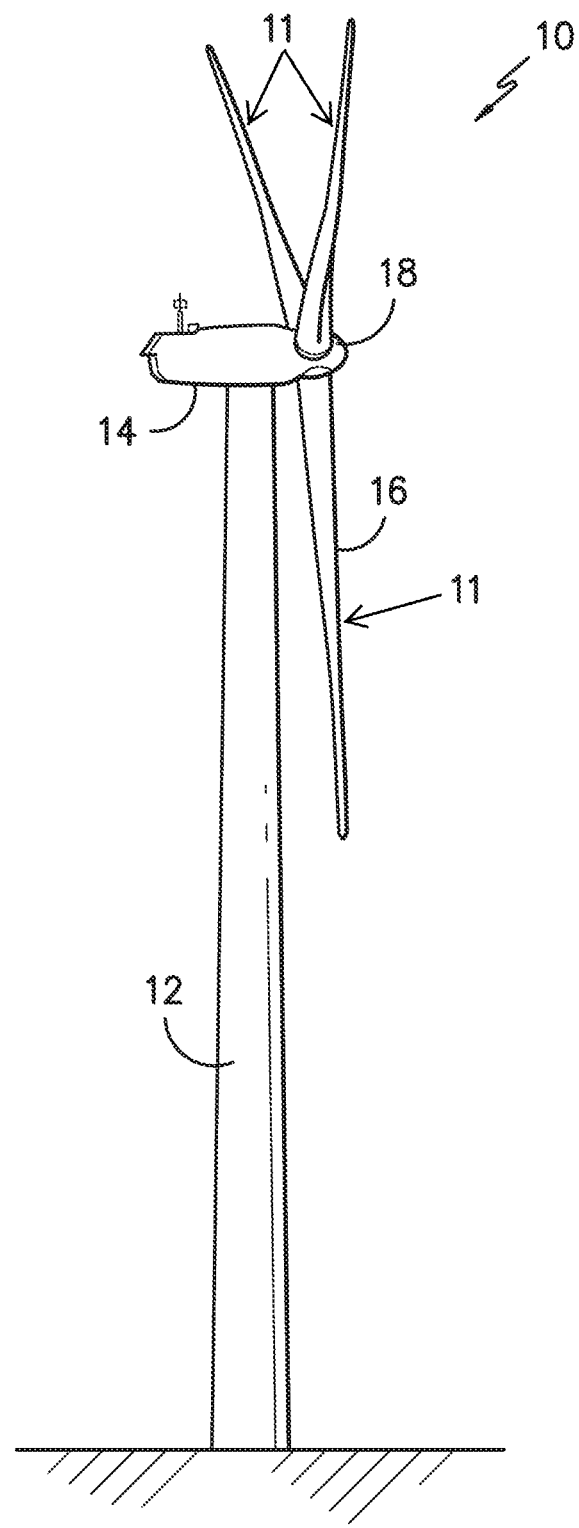
FIG. 1 is a perspective view of a wind turbine, in accordance with one embodiment of the present specification.

FIG. 1 is a perspective view of a wind turbine 10, in accordance with one embodiment of the present specification. The wind turbine 10 includes a tower 12 including a nacelle 14 mounted thereon, a plurality of rotor blade assemblies 11, and a rotor hub 18. The plurality of rotor blade assemblies 11 is mounted on the rotor hub 18. The rotor hub 18 is in turn connected to a main flange that turns a main rotor shaft (not shown). The wind turbine power generation and control components may be housed within the nacelle 14. A rotor blade assembly 11 of the plurality of rotor blade assemblies 11 includes a rotor blade 16 and at least one add-on element disposed thereon (not shown in FIG. 1). The view of FIG. 1 is provided for illustrative purposes in an exemplary field of use. It should be appreciated that the embodiments of the present specification are not limited to any particular type of wind turbine configuration. In some embodiments, one or more of the rotor blade assemblies 11 may be replaced by rotor blade assemblies described in FIGS. 11, 13, 15, and/or 17.

Figure 2:
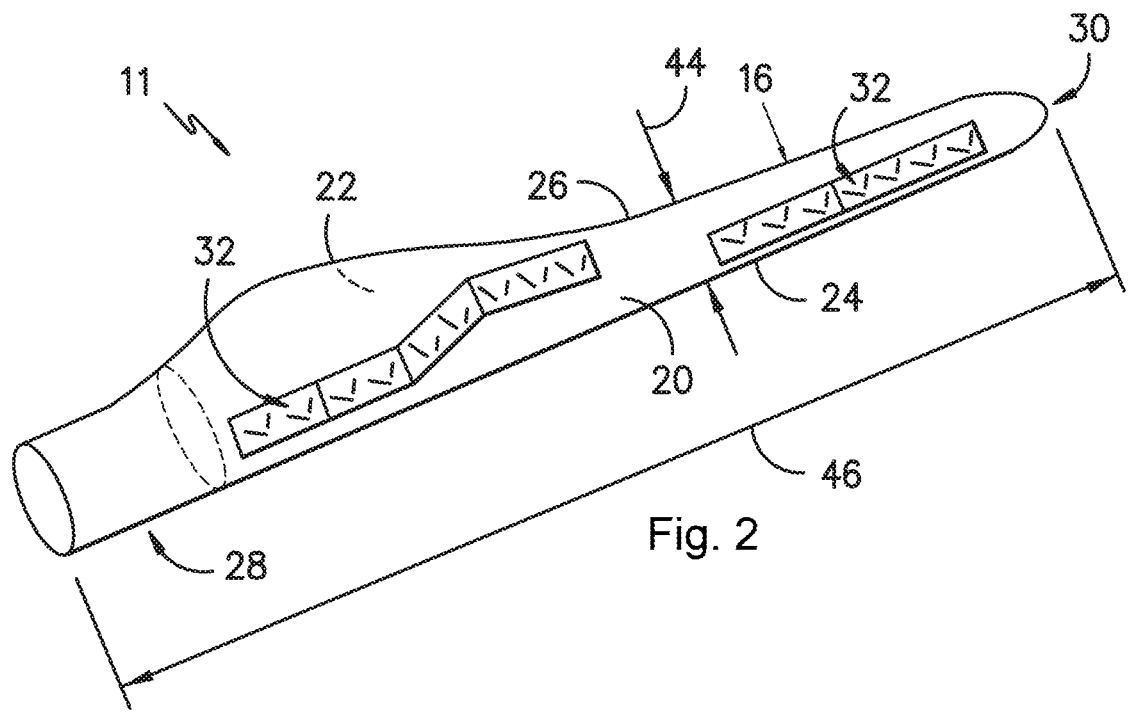
FIG. 2 is a perspective view of a rotor blade assembly, in accordance with one embodiment of the present specification.

Referring now to FIG. 2, a perspective view of the rotor blade assembly 11 is presented in accordance with one embodiment of the present specification. The rotor blade assembly 11 includes the rotor blade 16 and a plurality of add-on elements such as vortex generators 32. As shown in FIG. 2, the rotor blade 16 includes a suction side surface 20, a pressure side surface 22, a leading edge 24, and a trailing edge 26. Further, the rotor blade 16 extends from a root portion 28 to a tip portion 30. The vortex generators 32 in accordance with aspects of the present specification described in greater detail below are placed at any location on either or both of the suction or pressure side surfaces 20, 22 of the rotor blade 16. For example, as shown, the vortex generators 32 may be located at any location along the span 46 of the rotor blade and/or at any chord location. Other examples of the add-on elements may include, but are not limited to, a serration panel, a contour changing bump, a trailing edge extension structure, or combinations thereof.

As used herein and illustrated in FIG. 2, the span 46 of the rotor blade 16 generally refers to the direction extending between the root portion 28 to the tip portion 30, whereas the chord 44 of the rotor blades 16 generally refers to the direction extending between the leading edge 24 to the trailing edge 26. Further, the vortex generators 32 may be disposed closer to the root portion 28 of the rotor blade 16 as compared to the tip portion 30, or closer to the tip portion 30 as compared to the root portion 28.

Figure 3:
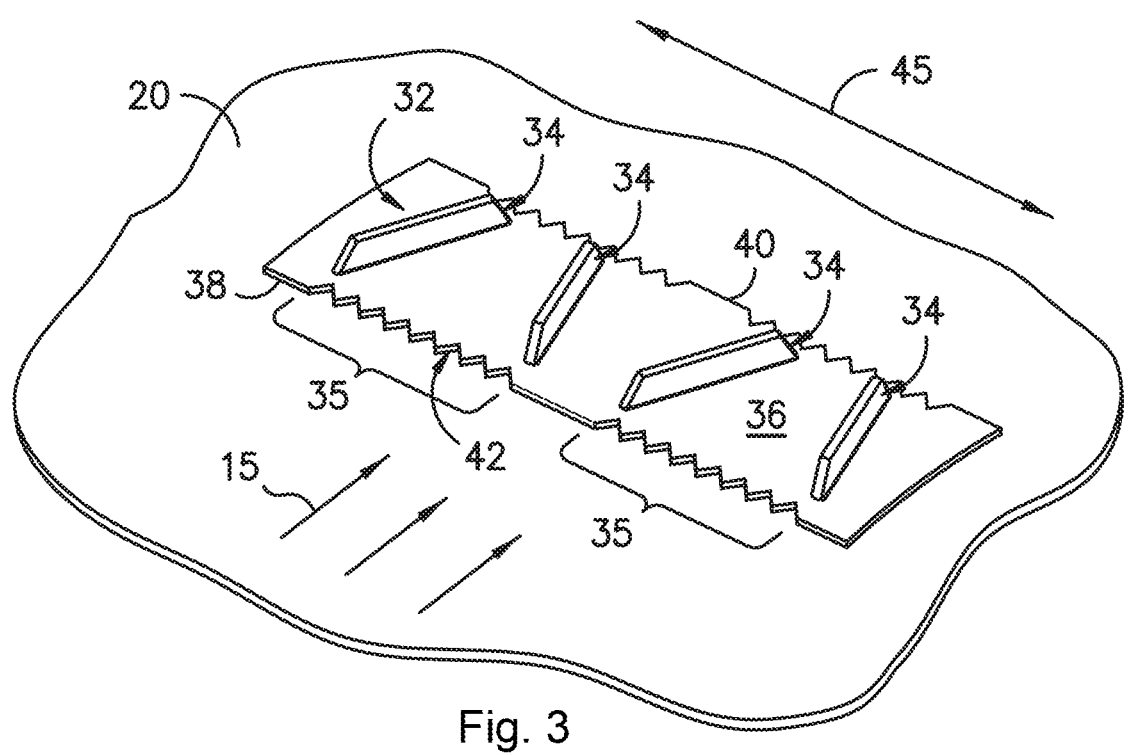
FIG. 3 is a perspective view of an add-on element such as a vortex generator mounted on a rotor blade, in accordance with one embodiment of the present specification.

In addition, as shown in FIGS. 2 and 3, the vortex generators 32 are depicted on the suction side surface 20 of the rotor blade 16. In additional embodiments, the vortex generators 32 of the present disclosure may also be mounted on the pressure side surface 22. Thus, the vortex generators 32 may be arranged in any suitable configuration on one of the suction or pressure side surfaces 20, 22 so as to provide the desired airflow. Further, the vortex generator(s) 32 may be mounted to the exterior of the rotor blade 16 through the use of, for example, adhesive or suitable mechanical fasteners.

Figure 6:
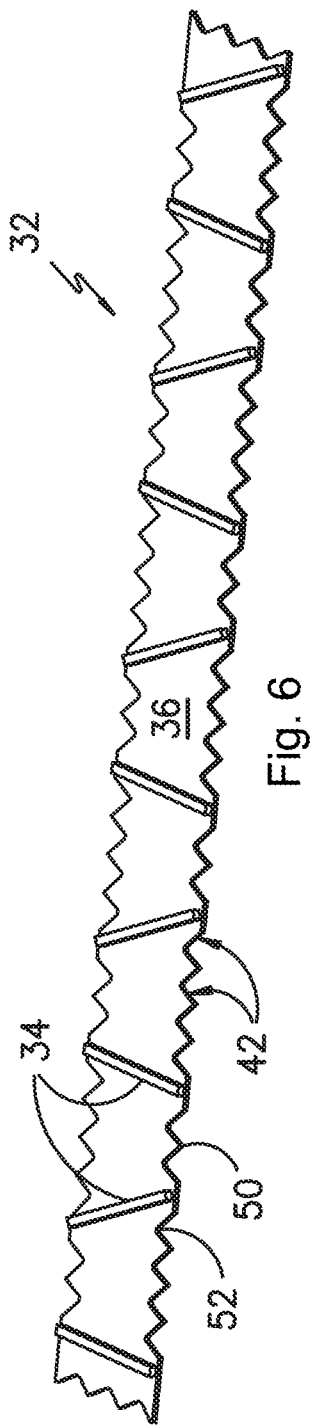
FIG. 6 is a top view of a vortex generator having noise-reducing features, in accordance with one embodiment of the present specification.

Further, as shown in FIG. 3, the vortex generator(s) 32 includes a base portion 36 with at least one airflow and particle trajectory modifying element 34 extending substantially perpendicular therefrom. For example, as shown in FIGS. 3 and 6, the vortex generators 32 include a base portion 36 having pairs 35 of airflow and particle trajectory modifying elements 34 or fins mounted at opposite angles with respect to each other. More specifically, corresponding pairs 35 of the airflow and particle trajectory modifying elements 34 may be angled away from each other, e.g. at a 45-degree angle, an acute angle, or an obtuse angle. For example, as shown in FIG. 3, the corresponding pairs 35 of the airflow and particle trajectory modifying elements 34 form an angle with respect to the wind direction 15.

Moreover, as shown in FIG. 3, the base portion 36 has a leading edge 38 and a trailing edge 40, with the leading edge 38 being the edge that faces into the wind direction 15. More specifically, in the illustrated embodiment, four airflow and particle trajectory modifying elements 34 are extending from the base portion 36. In further embodiments, more than four or less than four airflow and particle trajectory modifying elements 34 may extend from the base portion 36.

In some embodiments, the vortex generators 32 may be mounted on the suction or pressure side surfaces 20, 22 within a laminar flow region. Further, as shown, the vortex generators 32 are mounted on the rotor blade 16 in a first direction such that they are generally parallel to a laminar receptivity line 45. As used herein, the "laminar flow region" of the rotor blade 16 generally refers to the location of the blade upstream of where laminar airflow transitions to turbulent airflow. As such, the laminar flow region is dependent on many factors, including but not limited to flow speed, chord length, airfoil pressure distribution, the location of the adverse pressure gradients (i.e. where such pressure gradients start), angle of attack, and/or surface roughness. More specifically, as shown in FIG. 4, laminar flow separation may occur upstream of the vortex generator(s) 32, which may introduce airflow instabilities. Flow instabilities travel downstream and are amplified and scattered by the discontinuity created by the base portion 36 of the vortex generator(s) 32. The scattered acoustic waves propagate upstream, where they interact with and amplify the flow instabilities. As a result, a feedback loop 48 is created, and multiple acoustic tones are generated.

Figure 7:
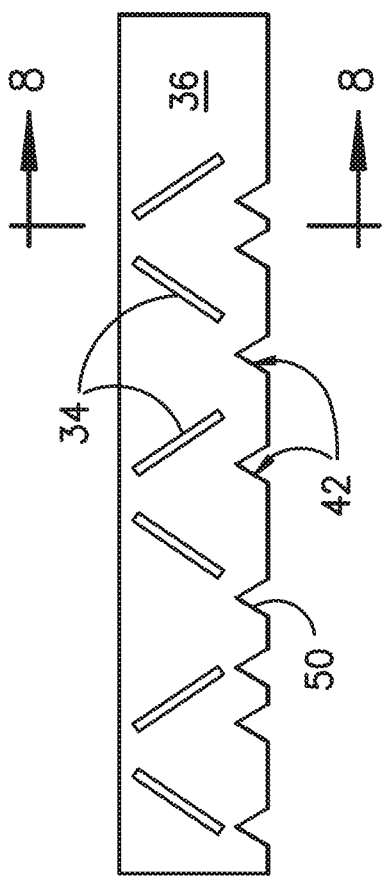
FIG. 7 is a top view of a vortex generator having noise-reducing features, in accordance with one embodiment of the present specification.

Thus, as shown generally in FIGS. 3, 5, and 6, the base portion 36 includes one or more edge features 42 formed within at least one of the leading edge 38 or trailing edge 40 and being locally non-parallel with respect to the first direction, i.e. the laminar receptivity line 45 so as to reduce laminar boundary layer instability noise. For example, as shown in FIGS. 5 and 6, the base portion 36 may include one or more edge features 42 formed within both the leading edge 38 and the trailing edge 40 thereof. In another embodiment, as shown in FIG. 6, the base portion 36 may include one or more edge features 42 formed around an entire periphery thereof. In still another embodiment, as shown in FIG. 3, the base portion 36 may include one or more edge features 42 upstream or downstream of corresponding pairs 35 of airflow and particle trajectory modifying elements 34. Further, as shown in FIG. 7, the edge features 42 may be formed in only one side of the base portion 36. In some embodiments, the base portion 36 may not include one or more edge features 42. For example, in such a configuration of the vortex generator(s) 32, the base portion 36 may have a straight or uniform outer boundary.

In some embodiments, the edge features 42 may include serrations, recesses, slits, slots, holes, channels, protrusions, ribs, or similar. Further, as shown in FIGS. 3 and 5-7, the base portion 36 of the vortex generator 32 includes a plurality of serrations 50. More specifically, the serrations 50 may have any suitable shape, including but not limited to U-shape, V-shape, C-shape, sinusoidal shape, rectangular shape, or a square shape. For example, the edge features 42 illustrated generally in FIGS. 3 and 5-7 include serrations 50 having a substantially V-shaped cross-section. Further, as shown, adjacent serrations 50 may generally define indentations 52 therebetween. While in exemplary embodiments, the serrations 50 are generally V-shaped, defining generally V-shaped indentations 52, in alternative embodiments the serrations 50 and indentations 52 may be U-shaped, or may have any other shape or configuration suitable for reducing laminar boundary layer instability noise. For example, in some embodiments, the serrations 50 and indentations 52 may be generally sinusoidal or squared-sinusoidal.

While exemplary embodiments of the edge features 42 are discussed herein, the edge feature 42 according to the present disclosure may have any suitable characteristics, such as a width, length, shape, or orientation, depending on the desired noise reduction characteristics for the vortex generator 32. Further, in exemplary embodiments, each individual edge feature 42 may have individual characteristics as required to achieve optimum noise reduction characteristics. In alternative embodiments, however, various groups of edge features 42 may have similar characteristics, or all edge features 42 may have similar characteristics, depending on the desired noise reduction characteristics for the vortex generator 32.

Figure 8:
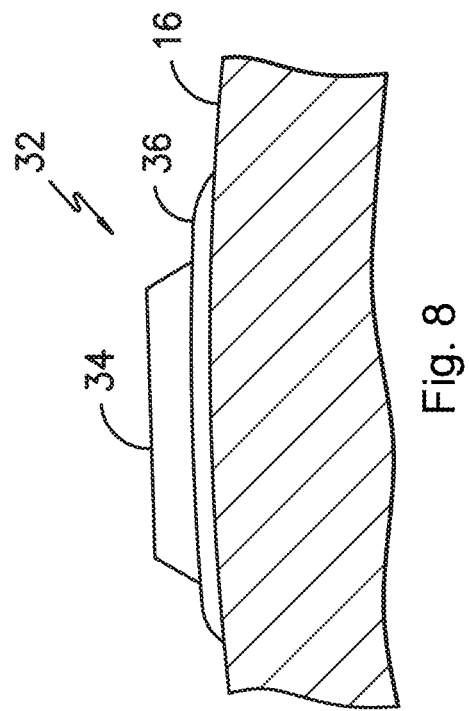
FIG. 8 is a cross-sectional side view depicting a vortex generator mounted to a rotor blade, in accordance with one embodiment of the present specification.

In addition, the edge features 42 may have a uniform pattern. Alternatively, as shown in FIG. 7, the edge features 42 formed within the base portion 36 may have a random pattern. In additional embodiments, as shown in FIG. 8, the edge features 42 may taper (or be chamfered) towards one of the suction or pressure side surfaces 20, 22 of the rotor blade 16.

Moreover, the vortex generator(s) 32 described herein may be constructed of any suitable material. For example, in one embodiment, the vortex generator(s) 32 may be formed of a relatively rigid material so as to develop the desired aerodynamic properties, e.g. plastic or metal material. Alternatively, the vortex generator(s) 32 may be constructed of a flexible, low durometer material.

Figure 9:
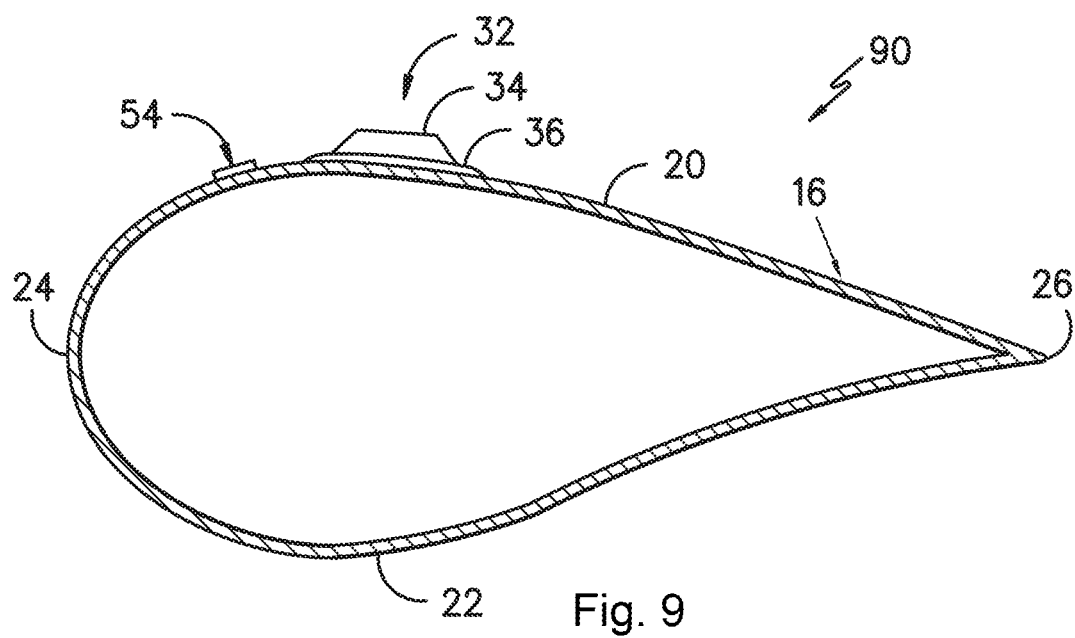
FIG. 9 is a cross-sectional view of a rotor blade assembly having an add-on element, for example, a vortex generator, mounted on a rotor blade, in accordance with one embodiment of the present specification.

Referring now to FIG. 9, is a cross-sectional view of a rotor blade assembly 90 having an add-on element, for example, the vortex generator 32, mounted thereon, in accordance with one embodiment of the present specification. As shown in FIG. 9, the rotor blade assembly 90 includes rotor blade 16, at least one vortex generator 32 mounted within the laminar flow region on either the suction or pressure side surfaces 20, 22 of the rotor blade 16, and at least one boundary-layer trip element 54 mounted upstream of the vortex generator 32.

For example, in certain embodiments, the boundary-layer trip element 54 may be a surface feature of a height H configured to disrupt the airflow upstream of the vortex generator 32 so as to force laminar airflow to turbulent airflow, thereby eliminating noise caused by laminar boundary layer instability. More specifically, in one embodiment, the height H of the boundary-layer trip element 54 may range between approximately 0.1 millimeters and approximately 2.5 millimeters. Further, in certain embodiments, the height H of the boundary-layer trip element 54 may range between approximately 0.5 millimeter and approximately 1.5 millimeters. Alternatively, the boundary-layer trip element 54 may be a surface feature having a certain roughness (e.g. sand paper, sand grains embedded in the paint, a rough paint surface), blowing holes or slots, and/or one or more recesses. More specifically, in one embodiment, the boundary-layer trip element 54 may include tape or one or more wires. In some embodiments, the boundary-layer trip element 54 may be configured as an erosion protection feature (see FIG. 15).

Figure 10:
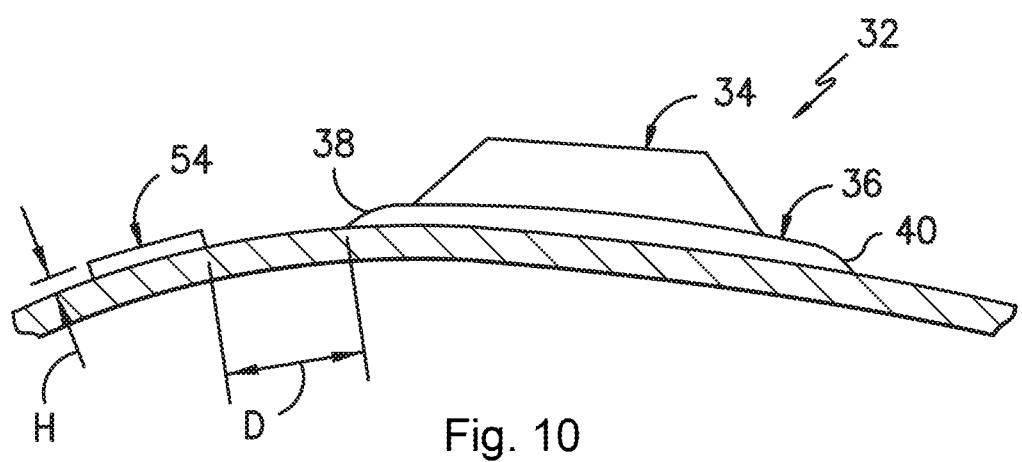
FIG. 10 is an expanded view of a portion of the cross-sectional view of the rotor blade assembly of FIG. 9, in accordance with one embodiment of the present specification.

In some embodiments, as shown in FIG. 10, the boundary-layer trip element 54 may be mounted at a predetermined distance D upstream of the vortex generator 32. As such, the predetermined distance D is configured to disrupt the airflow upstream of the vortex generator 32 so as to force laminar airflow to turbulent airflow. More specifically, in certain embodiments, the predetermined distance D may range from about 1 centimeter to about 40 centimeters. In another embodiment, the predetermined distance D may be determined as a function of a boundary layer thickness at a mounting location of the vortex generator 32.

Figure 11:
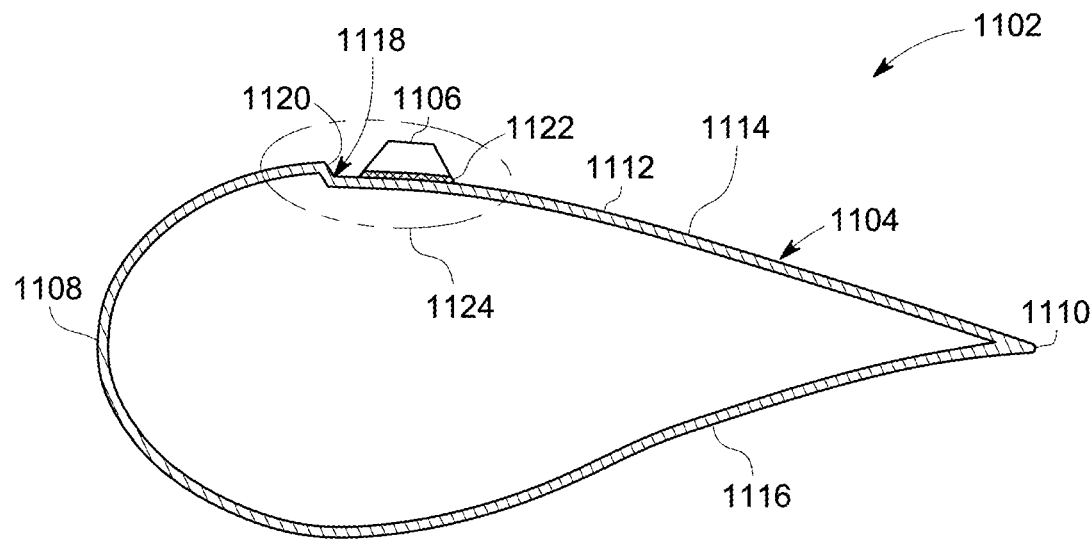
FIG. 11 is a cross-sectional view of a rotor blade assembly, in accordance with one embodiment of the present specification.

FIG. 11 is a cross-sectional view of a rotor blade assembly 1102, in accordance with one embodiment of the present specification. In some embodiments, the rotor blade assembly 11 of the wind turbine 10 of FIG. 1 may be replaced by the rotor blade assembly 1102 of FIG. 11. The rotor blade assembly 1102 includes a rotor blade 1104 and at least one add-on element 1106 mounted on the rotor blade 1104, as depicted in FIG. 11. The reference numerals 1108 and 1110 respectively represent a leading edge and a trailing edge of the rotor blade 1104. The at least one add-on element 1106 may include a vortex generator (see FIG. 13), a serration panel, a contour changing bump, a trailing edge extension structure, or combinations thereof.

The rotor blade 1104 includes a surface 1112. The surface 1112 of the rotor blade 1104 is hereinafter referred to as rotor blade surface 1112. The rotor blade surface 1112 includes a suction side surface 1114 and a pressure side surface 1116. Moreover, the rotor blade surface 1112 includes an inclined groove 1118. The rotor blade 1104 of FIG. 11 may be similar to the rotor blade 16 of the rotor blade assembly 11 of the wind turbine 10 of FIG. 1 except for presence of the inclined groove 1118 in the rotor blade 1104.

In some embodiments, the inclined groove 1118 may be formed by molding the rotor blade 1104. In certain embodiments, the inclined groove 1118 may be formed by machining, for example, grinding or milling, the rotor blade surface 1112. The inclined groove 1118 may be formed in the rotor blade surface 1112 such that a height of the rotor blade surface 1112 on a side of inclined groove 1118 toward the leading edge 1108 is higher than the height of the rotor blade surface 1112 on the other side of inclined groove 1118 toward the trailing edge 1110. Moreover, in the embodiment of FIG. 11, the rotor blade 1104 is shown to include the inclined groove 1118 on the suction side surface 1114. In some other embodiments, the rotor blade 1104 may include the inclined groove 1118 on the pressure side surface 1116 without limiting the scope of the present specification.

Moreover, the at least one add-on element 1106 is mounted on the rotor blade surface 1112 downstream of the inclined groove 1118. More particularly, the at least one add-on element 1106 is mounted on the rotor blade surface 1112 via a bonding interface 1122. The bonding interface 1122 may include an adhesive or suitable mechanical fasteners. The inclined groove 1118 includes a groove edge 1120. In certain embodiments, the inclined groove 1118 is a one-sided groove which includes only one groove edge 1120. As depicted in FIG. 11, the add-on element is mounted on the rotor blade surface 1112 downstream of the groove edge 1120. More particularly, the at least one add-on element 1106 is mounted on the rotor blade surface 1112 via the bonding interface 1122 downstream of the inclined groove 1118 such that particulate matter in an airflow upstream of the add-on element 1106 is deflected away from the bonding interface 1122 disposed between the rotor blade surface 1112 and the add-on element 1106. The particulate matter may include water droplets, insects, dust particles, droplets of a fluid, particles of a solid material, or combinations thereof.

The at least one add-on element 1106 may be disposed along a span of the rotor blade 1104. In some embodiments, a plurality of add-on elements 1106 may be disposed downstream of a single inclined groove 1118. In certain other embodiments, each add-on element 1106 may be disposed downstream of a corresponding one inclined groove 1118. In a non-limiting example, the rotor blade assembly 1102 may include one or more one-to-one pairs of the add-on element 1106 and the inclined groove 1118.

Figure 12:
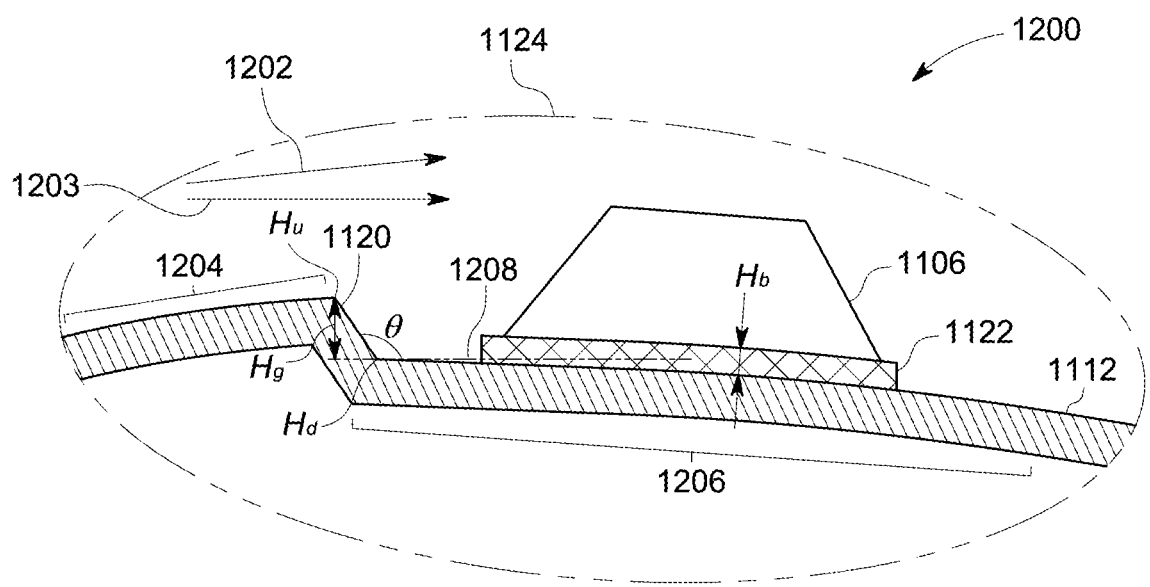
FIG. 12 is an expanded view of a portion of the cross-sectional view of the rotor blade assembly of FIG. 11, in accordance with one embodiment of the present specification.

Additional details of the rotor blade assembly 1102 are described in FIG. 12 with reference to an expanded view of a portion 1124 of the cross-sectional view of FIG. 11.

Referring now to FIG. 12, an expanded view 1200 of the portion 1124 of the cross-sectional view of the rotor blade assembly 1102 of FIG. 11 is presented, in accordance with one embodiment of the present specification. An arrow indicated by the reference numeral 1202 represents a direction of the airflow. In some embodiments, the particulate matter may follow a different direction than the direction 1202 of the airflow. By way of a non-limiting example, an arrow indicated by the reference numeral 1203, at a non-zero angle with respect to the direction 1202 of the airflow, represents a direction of the particulate matter. In certain embodiments, the particulate matter may follow the direction 1202 of the airflow. Accordingly, for the direction 1202 and/or 1203, regions indicated by the reference numerals 1204 and 1206, respectively, represent an upstream side and a downstream side with respect to the groove edge 1120. Also, a line 1208 represents a tangent to the downstream side 1206 of the rotor blade surface 1112 at the groove edge 1120.

In some embodiments, the rotor blade 1104 or the inclined groove 1118 may be formed such that the groove edge 1120 of the inclined groove 1118 defines an angle θ with respect to the tangent 1208. The angle θ between the groove edge 1120 and the tangent 1208 is an acute angle or an obtuse angle. For example, the angle θ between the groove edge 1120 and the tangent 1208 as depicted in FIG. 12 is an obtuse angle. In certain embodiments, the angle θ between the groove edge 1120 and the tangent 1208 may be a right angle.

Further, a notation ($H_u$) indicates a height of the rotor blade surface 1112 on the upstream side 1204 of the groove edge 1120. The height ($H_u$) is hereinafter referred to as an upstream height ($H_u$) of the rotor blade surface 1112. Also, a notation ($H_d$) indicates a height of the rotor blade surface 1112 on the downstream side 1206 of the groove edge 1120. The height ($H_d$) is hereinafter referred to as a downstream height ($H_d$) of the rotor blade surface 1112. The upstream height ($H_u$) and the downstream height ($H_d$) are defined at the groove edge 1120 with reference to the tangent 1208.

As depicted in FIG. 12, the inclined groove 1118 is formed such that the upstream height ($H_u$) of the rotor blade surface 1112 is more in comparison to the downstream height ($H_d$) of the rotor blade surface 1112. A height ($H_g$) of the groove edge 1120 may be defined as a difference between the upstream height ($H_u$) and the downstream height ($H_d$). In some embodiments, as depicted in FIG. 12, the height ($H_g$) of the groove edge 1120 may represent a perpendicular distance between the rotor blade surface 1112 on the upstream side 1204 at the groove edge 1120 and the tangent 1208. In some embodiments, since the downstream height ($H_d$) is defined with reference to the tangent 1208, the downstream height ($H_d$) is equal to zero. Consequently, the height ($H_g$) of the groove edge 1120 is equal to upstream height ($H_u$). The term "height ($H_g$) of the groove edge" is hereinafter referred to as a groove edge height ($H_g$). Moreover, in some embodiments, the inclined groove 1118 is formed such that the groove edge height ($H_g$) is more than a height ($H_b$) of the bonding interface 1122. The height ($H_b$) of the bonding interface 1122 represents a thickness of the bonding interface 1122 as depicted in FIG. 12. Advantageously, the groove edge height ($H_g$) being more than the height ($H_b$) of the bonding interface 1122 may pose hindrance in the path of the particulate matter in the airflow to reach the bonding interface 1122. Consequently, contamination, erosion, and/or any other damage (e.g., lifting-off) of the bonding interface 1122 may be reduced or eliminated.

Figure 13:
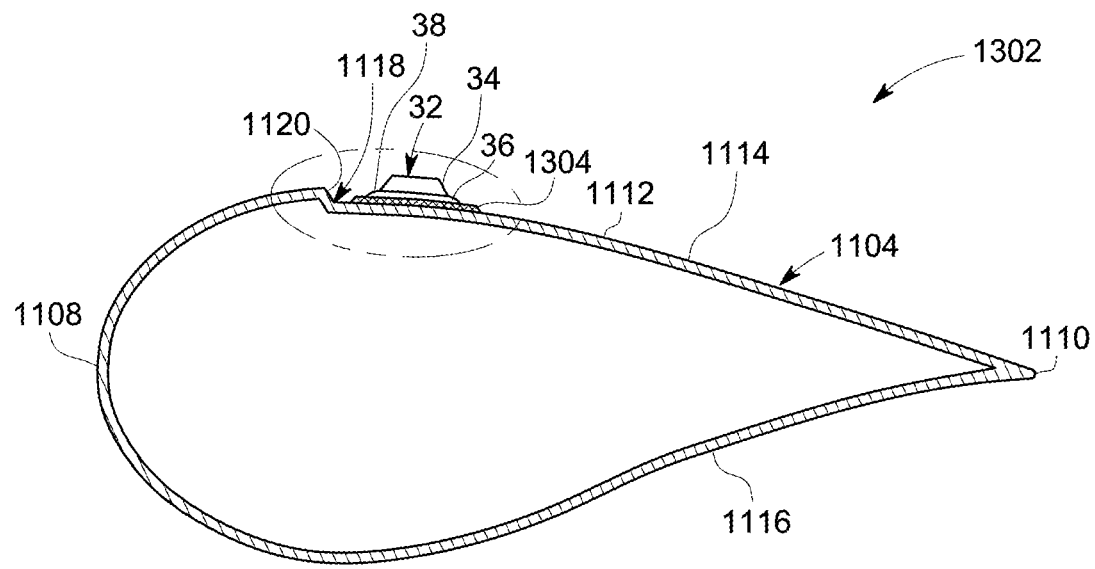
FIG. 13 is a cross-sectional view of a rotor blade assembly including a rotor blade such as the rotor blade of FIG. 11 and a vortex generator mounted on the rotor blade, in accordance with one embodiment of the present specification.

FIG. 13 is a cross-sectional view of a rotor blade assembly 1302 including a rotor blade such as the rotor blade 1104 of FIG. 11 and a vortex generator such as the vortex generator 32 mounted on the rotor blade 1104, in accordance with one embodiment of the present specification. For brevity, details of the rotor blade 1104 and the vortex generator 32 are not repeated herein. As depicted in FIG. 13, the vortex generator 32 is mounted on the rotor blade surface 1112 downstream of the inclined groove 1118. The vortex generator 32 is mounted on the rotor blade surface 1112 downstream of the groove edge 1120. More particularly, the vortex generator 32 may be mounted such that the leading edge 38 of the vortex generator 32 faces the groove edge 1120. The vortex generator 32 may be mounted on the rotor blade surface 1112 via a bonding interface 1304 which is similar to the bonding interface 1122 shown in FIGS. 11-12. Such arrangement of the vortex generator 32 downstream of the inclined groove 1118 results in the particulate matter in the airflow upstream of the vortex generator 32 being deflected away from the bonding interface 1304. Additional structural details of the rotor blade assembly 1302 are described with reference to an expanded view of a portion 1306 of the cross-sectional view of FIG. 13 in FIG. 14.

Figure 14:
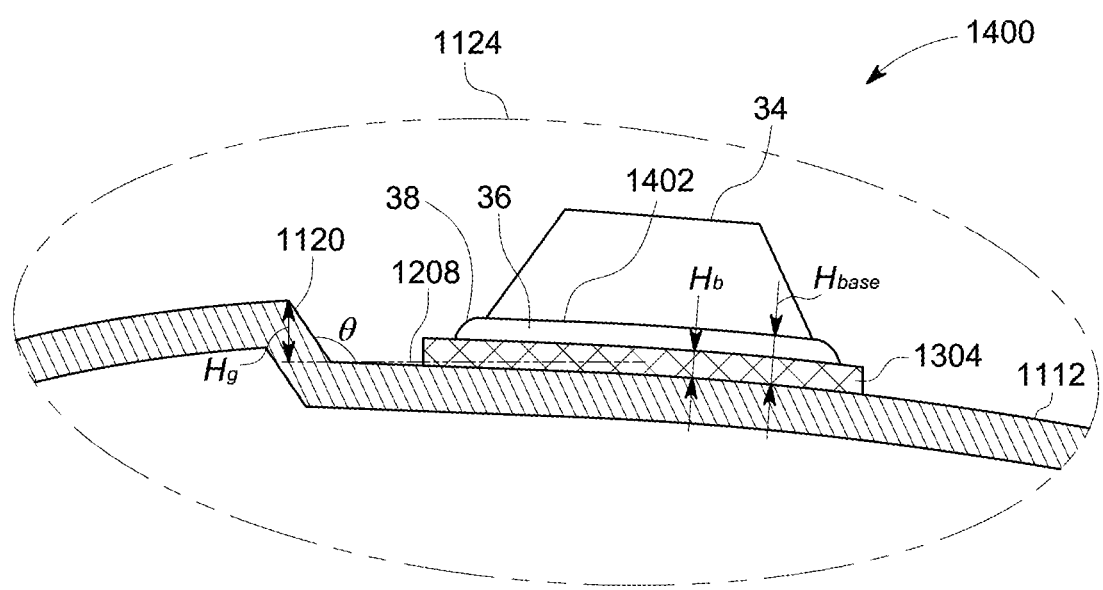
FIG. 14 is an expanded view of the cross-sectional view of the rotor blade assembly of FIG. 13, in accordance with one embodiment of the present specification.

In FIG. 14, an expanded view 1400 of the portion 1306 of the cross-sectional view of the rotor blade assembly 1302 of FIG. 13 is presented, in accordance with one embodiment of the present specification. For brevity, components and notations described in the detailed description above have not been described again in FIG. 14. As depicted in FIG. 14, in some embodiments, the inclined groove 1118 may be formed such that the groove edge height ($H_g$) is more than a base height ($H_{base}$), where the base height ($H_{base}$) represents a height of a top edge 1402 of the base portion 36 from the rotor blade surface 1112. It is apparent that the base height ($H_{base}$) is more than the height ($H_b$) of the bonding interface 1122 as the bonding interface 1304 is between the vortex generator 32 and the rotor blade surface 1112. In certain embodiments, the inclined groove 1118 may be formed such that the groove edge height ($H_g$) is more than the height ($H_b$) of the bonding interface 1122 but is less than the base height ($H_{base}$). In some other embodiments, the inclined groove 1118 may be formed such that the groove edge height ($H_g$) is equal to the base height ($H_{base}$). In certain embodiments, the groove edge height ($H_g$) is equal to the base height ($H_{base}$). In certain other embodiments, the groove edge height ($H_g$) and the base height ($H_{base}$) are selected such that a height difference between the groove edge height ($H_g$) and the base height ($H_{base}$) is in a predefined tolerance range.

In some embodiments, the predefined tolerance range may be determined based on laminar boundary layer feedback tones and drag increase for a given rotor blade assembly, for example, the rotor blade assembly 1302. In a non-limiting example, the predefined tolerance range may be determined based on a thickness of a laminar boundary layer which in turn depends on a chord, an airfoil, the Reynolds number, and an angle of attack (AoA) for the given rotor blade assembly. In certain embodiments, the predefined tolerance range may be selected such that scattering of velocity fluctuations into sound may be minimized or eliminated. For example, the predefined tolerance range may be a in range between 0.5 mm to 1.5 mm. In another example, the predefined tolerance range may be in a range between 0.5 mm to 2 mm.

Figure 15:
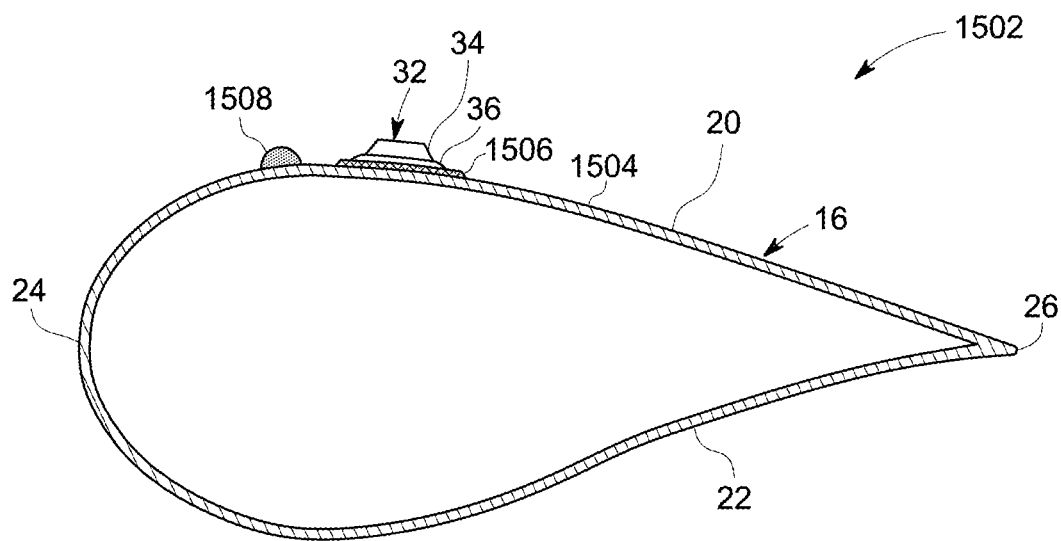
FIG. 15 is a cross-sectional view of a rotor blade assembly, in accordance with one embodiment of the present specification.

FIG. 15 is a cross-sectional view of a rotor blade assembly 1502, in accordance with one embodiment of the present specification. In some embodiments, the rotor blade assembly 11 of the wind turbine 10 of FIG. 1 may be replaced by the rotor blade assembly 1502 of FIG. 15. The rotor blade assembly 1502 includes a rotor blade 16 and at least one add-on element 32, for example, the vortex generator 32 mounted on the rotor blade 16, as depicted in FIG. 11. The rotor blade 16 includes a surface 1504. The surface 1504 of the rotor blade 16 is hereinafter referred to as rotor blade surface 1504. The reference numerals 24 and 26 respectively represent a leading edge and a trailing edge of the rotor blade 16. Other non-limiting examples of the add-on element that may be used in place of the vortex generator 32 may include, a serration panel, a contour changing bump, a trailing edge extension structure, or combinations thereof. The add-on element 32/vortex generator 32 is mounted on the rotor blade surface 1504 via a bonding interface 1506 as depicted in FIG. 15. The bonding interface 1506 may be similar to the bonding interface 1122 of FIG. 11.

Additionally, the rotor blade assembly 1502 includes at least one erosion protection feature 1508 protruding from the rotor blade surface 1504. More particularly, the erosion protection feature 1508 is located upstream of the at least one add-on element such that particulate matter in an airflow upstream of the at least one add-on element 32 is deflected away from the bonding interface 1506 by the at least one erosion protection feature 1508. In some embodiments, the at least one erosion protection feature 1508 includes a curved surface. In some certain embodiments, the erosion protection feature 1508 is a hump as depicted in FIG. 15. More particularly, the erosion protection feature 1508 is a hemisphere shaped protrusion. Although, the erosion protection feature 1508 of a hemispherical shape is depicted in FIG. 15, the erosion protection feature of other shapes may also be employed without limiting the scope of the present specification. Additionally, in certain embodiments, the curved surface of the erosion protection feature 1508 includes a wave shaped outer surface (see FIG. 17). In some embodiments, the rotor blade surface 1504 may be molded to achieve a shape, for example, the hump, similar to erosion protection feature 1508.

Figure 16:
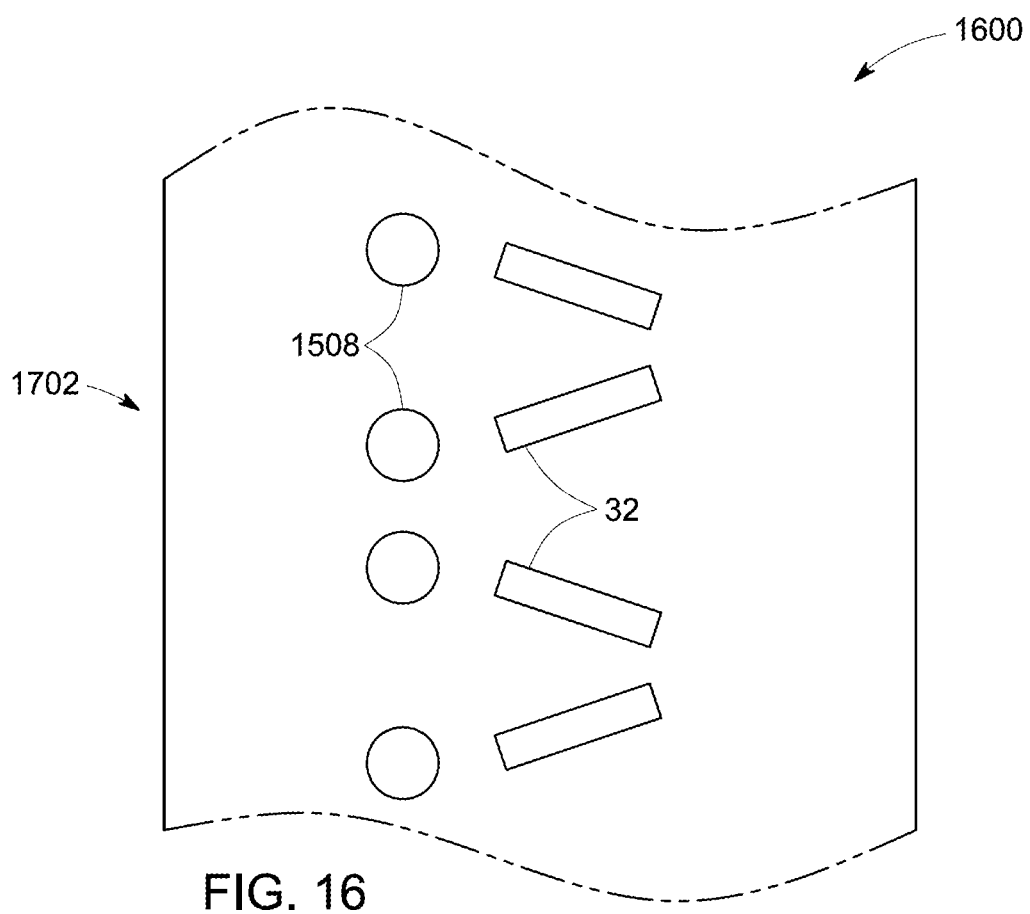
FIG. 16 is a top view of a portion of the rotor blade assembly of FIG. 15, in accordance with one embodiment of the present specification.

Further, FIG. 16 represents a top view 1600 of a portion of the rotor blade assembly 1502 of FIG. 15, in accordance with one embodiment of the present specification. Moreover, in the top view 1600, a plurality of add-on elements 32 and a plurality of erosion protection features 1508 are depicted. In some embodiments, each of the erosion protection features 1508 is aligned with a corresponding add-on element 32 of the at least one add-on element 32, respectively vice versa, such that erosion protection feature encounters and hinders the airflow directed toward the corresponding add-on element.

Figure 17:
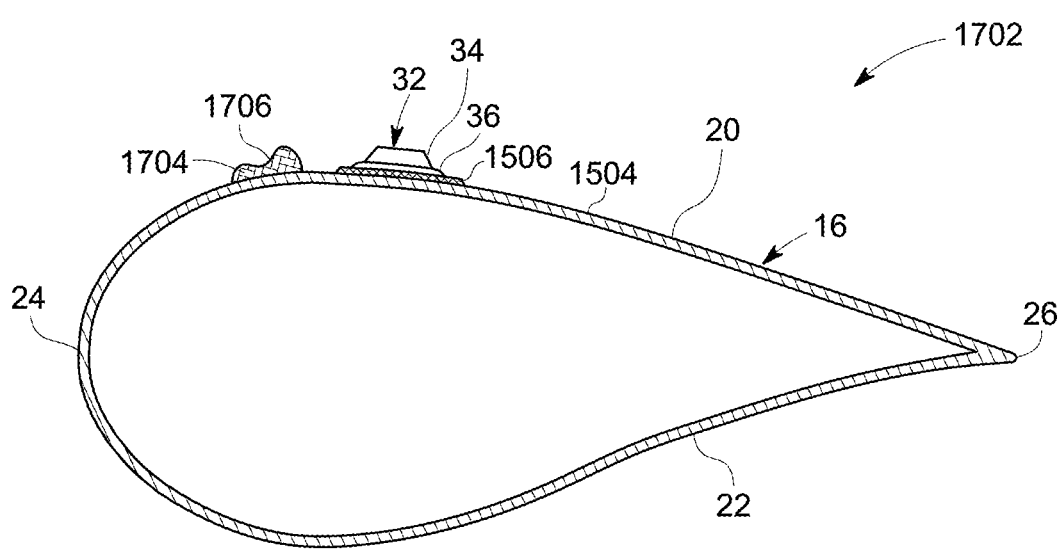
FIG. 17 is a cross-sectional view of a rotor blade assembly, in accordance with one embodiment of the present specification.

FIG. 17 is a cross sectional view of a rotor blade assembly 1702, in accordance with one embodiment of the present specification. The rotor blade assembly 11 of the wind turbine 10 of FIG. 1 may be replaced by the rotor blade assembly 1702 of FIG. 17. The rotor blade assembly 1702 of FIG. 17 includes some components already described in FIGS. 15 and 17, details of which is not repeated herein. In comparison to the rotor blade assembly 1502 of FIG. 15, the rotor blade assembly 1702 of FIG. 17 includes a different erosion protection feature 1704. More particularly, as depicted, a curved surface 1706 of the erosion protection feature 1704 is waved shaped. Use of the erosion protection feature having any other type of curved shape is also envisioned within the purview of the present specification.

The rotor blade assemblies presented in accordance with some embodiments result in an improved structural reliability. For example, the presence of the inclined groove and the erosion protection feature aids in hindering particulate matter directed toward the bonding interface between the add-on element and the rotor blade surface. In certain embodiments, the particulate matter may be deflected away from the bonding interface by the inclined groove or the erosion protection feature thereby protecting the bonding interface.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. A rotor blade assembly for a wind turbine, comprising:
   a rotor blade comprising a leading edge and a surface, wherein the surface of the rotor blade comprises an inclined groove formed into and recessed within the surface, the inclined groove being a one-sided groove having only one groove edge, the surface defining an arcuate shape extending between the leading edge and the groove edge in a chordwise direction; and
   at least one add-on element mounted on the surface of the rotor blade via a bonding interface, the at least one add-on element being spaced apart from and downstream of the inclined groove such that particulate matter in an airflow upstream of the at least one add-on element is deflected away from the bonding interface between the surface of the rotor blade and the at least one add-on element.

2. The rotor blade assembly of claim 1, wherein the inclined groove is formed such that a height of the surface of the rotor blade is more on an upstream side of the groove edge in comparison to a height of the surface of the rotor blade on a downstream side of the groove edge.

3. The rotor blade assembly of claim 1, wherein the at least one add-on element is mounted downstream of the groove edge.

4. The rotor blade assembly of claim 1, wherein a height of the groove edge is more than a height of the bonding interface.

5. The rotor blade assembly of claim 1, wherein a height of the groove edge is equal to a base height of the at least one add-on element.

6. The rotor blade assembly of claim 1, wherein a height of the groove edge and a base height of the at least one add-on element are selected such that a height difference between the height of the groove edge and the base height is in a predefined tolerance range.

7. The rotor blade assembly of claim 1, wherein the at least one add-on element comprises a vortex generator, a serration panel, a trailing edge extension structure, or combinations thereof.

8. A wind turbine, comprising:
   a tower;
   a rotor hub mounted on the tower; and
   a plurality of rotor blade assemblies mounted in the rotor hub, wherein one or more of the plurality of rotor blade assemblies comprise:
   a rotor blade comprising a leading edge and a surface, wherein the surface of the rotor blade comprises an inclined groove formed into and recessed within the surface, the inclined groove being a one-sided groove having only one groove edge, the surface defining an arcuate shape extending between the leading edge and the groove edge in a chordwise direction; and
   at least one add-on element mounted on the surface of the rotor blade via a bonding interface, the at least one add-on element being spaced apart from and downstream of the inclined groove such that particulate matter in an airflow upstream of the at least one add-on element is deflected away from the bonding interface between the surface of the rotor blade and the at least one add-on element.

9. The wind turbine of claim 8, wherein the inclined groove is formed such that a height of the surface of the rotor blade is more on an upstream side of the groove edge in comparison to a height of the surface of the rotor blade on a downstream side of the groove edge.

10. The wind turbine of claim 8, wherein the at least one add-on element is mounted on a downstream side of the groove edge.

11. The wind turbine of claim 8, wherein a height of the groove edge is more than a height of the bonding interface disposed between the surface of the rotor blade and the at least one add-on element.

12. The wind turbine of claim 8, wherein the at least one add-on element comprises a vortex generator, a serration panel, a trailing edge extension structure, or combinations thereof.

* * * * *